United States Patent [19]

Chang et al.

[11] Patent Number: 4,876,228
[45] Date of Patent: Oct. 24, 1989

[54] ZEOLITE MODIFICATIONS

[75] Inventors: Clarence D. Chang, Princeton; Cynthia T-W Chu, Pennington; Pochen Chu, West Deptford; Ralph M. Dessau, Edison; William E. Garwood, Haddonfield; Guenter H. Kuehl, Cherry Hill; Joseph N. Miale, Lawrenceville; David S. Shihabi, Pennington, all of N.J.

[73] Assignee: Mobil Oil Corporation, New York, N.Y.

[21] Appl. No.: 163,191

[22] Filed: Feb. 25, 1988

Related U.S. Application Data

[60] Continuation of Ser. No. 24,904, Mar. 12, 1987, abandoned, which is a continuation of Ser. No. 724,370, Apr. 17, 1985, abandoned, which is a continuation-in-part of Ser. No. 631,687, Jul. 16, 1984, Pat. No. 4,559,315, which is a continuation-in-part of Ser. No. 465,987, Feb. 14, 1983, Pat. No. 4,513,091, said Ser. No. 724,370, is a continuation-in-part of Ser. No. 555,118, Nov. 25, 1983, Pat. No. 4,550,092, which is a division of Ser. No. 317,037, Nov. 21, 1981, Pat. No. 4,435,516.

[51] Int. Cl.$^4$ ............................................. B01J 29/28
[52] U.S. Cl. ...................................... 502/71; 502/77; 502/85
[58] Field of Search ............................. 502/71, 77, 85

[56] References Cited

U.S. PATENT DOCUMENTS

| | | | |
|---|---|---|---|
| 3,326,797 | 6/1967 | Young et al. | 208/111 |
| 3,374,182 | 3/1968 | Young | 423/328 C |
| 4,443,554 | 4/1984 | Dessau | 502/71 |
| 4,468,475 | 8/1984 | Kuehl | 502/71 |
| 4,477,582 | 10/1984 | Miale | 502/26 |
| 4,478,950 | 10/1984 | Chu | 502/85 |
| 4,524,055 | 6/1985 | Onodera et al. | 423/328 |
| 4,559,314 | 12/1985 | Shihabi | 502/71 |
| 4,563,435 | 1/1986 | Chu et al. | 502/71 |
| 4,594,333 | 6/1986 | Chang et al. | 502/85 |
| 4,596,704 | 6/1986 | Miale et al. | 423/328 |

OTHER PUBLICATIONS

U.S. appliation Ser. No. 64,738, filed 6/22/87.

Primary Examiner—Carl F. Dees
Attorney, Agent, or Firm—Alexander J. McKillop; Charles J. Speciale; Laurence P. Hobbes

[57] ABSTRACT

A method is disclosed for modifying an aluminosilicate-containing inorganic solid having a predetermined ion exchange capacity and containing an extractable silica by contacting, in the absence of added organic nitrogen or organic phosphorous compound and added activating metal oxide, the porous solid with liquid water at a pH of at least 6, at a temperature of up to 370° C. for about 1 to 100 hours, and recovering a crystalline solid having an ion exchange capacity greater than the starting inorganic solid.

9 Claims, No Drawings

ZEOLITE MODIFICATIONS

CROSS REFERENCE TO RELATED APPLICATIONS

This invention is a continuation of Ser. No. 024,904 filed Mar. 12, 1987 (abandoned), which is a continuation of Ser. No. 724,370 filed Apr. 17, 1985 (abandoned), which is a continuation-in-part of Ser. No. 631,687 filed July 16, 1984 now U.S. Pat. No. 4,559,315, which is a continuation in part Ser. No. 465,987 filed Feb. 14, 1983 now U.S. Pat. No. 4,513,091. Ser. No. 724,370 is also a continuation-in-part of Ser. No. 555,118 filed Nov. 25, 1983 now U.S. Pat. No. 4,550,092 which is a division of Ser. No. 317,037 filed Nov. 21, 1981 now U.S. Pat. No. 4,435,516.

FIELD OF THE INVENTION

This invention is broadly concerned with modifying a pre-formed highly siliceous crystalline zeolite to increase its ion exchange capacity and its acid catalytic activity, and with the use of such modified zeolites in organic conversion reactions and for ion-exchange separations.

BACKGROUND OF THE INVENTION

Zeolite catalysts have become widely used in the processing of petroleum and in the production of various petro- chemicals. Acid catalyzed reactions such as cracking, hydro- cracking, catalytic dewaxing, alkylation, dealkylation, transalkylation, isomerization, polymerization, addition, disproportionation, conversion of methanol to hydrocarbons, and other acid catalyzed reactions may be performed with the aid of these catalysts. Both natural and synthetic zeolites are known to be active for these reactions.

The common crystalline zeolite catalysts are the aluminosilicates such as Zeolites A, X, Y and mordenite. Structurally, each such material can be described as a robust three dimensional framework of $SiO_4$ and $AlO_4$ tetrahedra that are crosslinked by the sharing of oxygen atoms whereby the ratio of total aluminum and silicon atoms to oxygen is 1:2. These structures (as well as other crystalline zeolites of catalytic usefulness) are porous, and permit access of reactant molecules to the interior of the crystal through windows formed of eight-membered rings (small pore) or of twelve-membered rings (large pore). The electrovalence of the aluminum that is tetrahedrally contained in the robust framework is balanced by the inclusion of cations in the channels (pores) of the crystal.

An "oxide" empirical formula that has been used to describe the above class of crystalline zeolites is

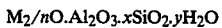

$M_{2/n}O.Al_2O_3.xSiO_2.yH_2O$ wherein M is a cation with valence n, x has a value of from 2 to 10, and y has a value which depends on the pore volume of the particular crystal structure under discussion. The empirical oxide formula may be rewritten as a general "structural" formula

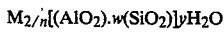

$M_{2/n}[(AlO_2)_w(SiO_2)]yH_2O$ wherein M and y are defined as above, and wherein w has a value from 1 to 5. In this representation, the composition of the robust framework is contained within the square brackets, and the material (cations and water) contained in the channels is shown outside the square brackets. One skilled in the art will recognize that x in the empirical oxide formula represents the mole ratio of silica to alumina in the robust framework of a crystalline zeolite, and shall be referred to herein simply by the expression in common usage, i.e. "the silica to alumina ratio". (See "Zeolite Molecular Sieves", Donald W. Breck, Chapter One, John Wiley and Sons, New York, N.Y. 1974, which is incorporated herein by reference as background material).

With few exceptions, (such as with Zeolite A wherein x = 2) thre are fewer alumina tetrahedra than silica tetrahedra in the robust frameworks of the crystalline zeolites. Thus, in general, aluminum represents the minor tetrahedrally coordinated constituent of the robust frameworks of the common zeolites found in nature or prepared by the usual synthetic methods that employ only inorganic reagents.

For the above common zeolite compositions, wherein x has a value of 2 to 10, it is known that the ion exchange capacity measured in conventional fashion is directly proportional to the amount of the minor constituent in the robust framework, provided that the exchanging cations are not so large as to be excluded by the pores. If the zeolite is exchanged with ammonium ions and calcined to convert it to the hydrogen form, it aquires a large catalytic activity measured by the alpha activity test for cracking n-hexane, which test is more fully described below. And, the ammonium form itself desorbs ammonia at high temperature in a characteristic fashion.

It is generally recognized that the composition of the robust framework of the synthetic common zeolites, wherein x = 2 t0 10, may be varied within relatively narrow limits by changing the proportion of reactants, e.g., by changing the concentration of the silica relative to the alumina in the zeolite forming mixture. However, definite limits, for example in the maximum obtainable silica to alumina ratio, are observed. Synthetic faujasites having a silica to alumina ratio of about 5.2 to 5.6 can be obtained by changing said relative proportions. However, if the silica proportion is increased above the level which produces the 5.6 ratio, no commensurate increase in the silica to alumina ratio of the crystallized synthetic faujasite is observed. Thus, the silica to alumina ratio of about 5.6 must be considered an upper limit for synthetic faujasite in a preparative process using conventional reagents. Corresponding limits in the silica to alumina ratio of mordenite and erionite via the synthetic pathway are also observed.

A class of synthetic high silica content crystalline zeolites wherein x is at least 12, has recently been discovered. In general, such zeolites are made from a forming solution which contains an organic template. Unlike the common synthetic zeolites, these high-silica content zeolites appear to have no natural counterpart. Members of this new class of zeolites have many advantageous properties, which properties generally include a high degree of structural stability. They are used or have been proposed for use in various processes, especially catalytic processes. Known materials of this type include, for example, ZSM-beta (U.S. Pat. No. 3,308,069), ZSM-5 (U.S. Pat. No. 3,702,886), ZSM-11 (U.S. Pat. No. 3,709,979), and ZSM-12 (U.S. Pat. No. 3,832,449).

Unlike the common zeolites decribed above wherein x = 2 to 5, the silica to alumina ratio for at least some of the high silica content zeolites is unbounded, i.e. the ratio may be infinitely large. ZSM-5 is one such example. U.S. Pat. No. Re. 29,948 to Dwyer et al. discloses a crystalline organosilicate essentially free of aluminum and exhibiting an X-ray diffraction pattern characteristic of ZSM-5 type aluminosilicates. Some other high silica content zeolites, however, appear to behave more like the common zeolites in that the upper limit of the compositional range of the crystals is fixed regardless of the silica content of the forming solution.

It is sometimes desirable to obtain a particular zeolite, for any of several reasons, with higher or a lower silica to alumina ratio than is available by direct synthesis. With ion-exchange applications, for example and for catalytic reactions such as hydrocracking which require high acidity catalysts, low silica to alumina ratios are favorable. For structural stability to heat and steam, or high-temperature xylene isomerization, high silica to alumina ratios are required.

BRIEF SUMMARY OF THE INVENTION

This invention provides a method whereby a preformed high silica content crystalline inorganic solid may be readily modified, in the absence of added organic nitrogen compounds and/or added organic phosphorous compounds, to increase the ion exchange capacity and the catalytic activity of the preformed zeolite. The method comprises contacting the preformed crystals with liquid water at a pH of at least about 6 for from less than about one hour to about 100 hours at a temperature up to 370° C., and recovering a crystalline solid having an ion-exchange capacity greater than the preformed material. The method provided may be conducted either with the porous solid crystals or with a physical mixture of the porous solid crystals and an activating metal oxide, all as more fully described hereinbelow.

DETAILED DESCRIPTION AND SPECIFIC EMBODIMENTS

The preformed, porous crystalline high silica content inorganic solid to be modified by the method of this invention are often referred to as zeolites, although there is controversy among various workers about the propriety of using the term "zeolites" to describe such solids. In this specification we shall sometimes use the terms interchangeably, it being understood that either term refers to a structure in which the major framework component is silica and a minor framework element in present even if in only very small amounts.

A preferred class of porous crystalline solids is that in which the silica to alumina (or other minor element) ratio is at least 12, and which have a substantial sorption capacity for normal hexane.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels.

The preferred type zeolites referred to herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not of the ZSM-5 type. Windows of 10-membered rings are preferred, although in some instances excessive puckering of the rings or pore blockage may render these zeolites ineffective. 12-membered rings usually do not offer sufficient constraint to produce the advantageous conversions, although the puckered 12-ring structure of TMA offretite shows constrained access. Other 12-ring structures may exist which, due to pore blockage or to other cause, may be operative.

Rather than attempt to judge from crystal structure whether or not a zeolite possesses the necessary constrained access to molecules larger than normal paraffins, a simple determination of the "constraint Index", or C.I., as herein defined may be made by passing continuously a mixture of an equal weight of normal hexane and 3-methylpentane over a small sample, approximately one gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature is adjusted between 550° F. and 950° F. to give an overall conversion between 10% and 60%. The mixture of hydrocarbons is passed at 1 liquid hourly space velocity (i.e. 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The C.I. is calculated as follows:

$$C.I. = \frac{\log(\text{fraction of n-hexane remaining})}{\log(\text{fraction of 3-methylpentane remaining})}$$

The Constraint Index approximates the ratio of the cracking rate constants for the two hydrocarbons. Preferred zeolites suitable for the present invention are those having a Constraint Index of 1 to 12. C.I. values for some typical zeolites are:

TABLE VI

| CAS | C.I. |
|---|---|
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Beta | 0.6 |
| H—Zeolon (mordenite) | 0.4 |
| REY | 0.4 |
| Amorphous Silica-Alumina | 0.6 |

TABLE VI-continued

| CAS | C.I. |
|---|---|
| Erionite | 38 |

The above-described Constraint Index is an important definition of those zeolites which are preferred and useful in the instant invention. The very nature of this parameter and the recited technique by which it is determined, however, admit of the possibility that a given zeolite can be tested under somewhat different conditions and thereby have different Constraint Indexes. Constraint Index seems to vary somewhat with severity of operation (conversion) and the presence or absence of binders. Therefore, it will be appreciated that it may be possible to so select test conditions to establish more than one value in the range of 1 to 12 for the Constraint Index of a particular zeolite. Such a zeolite exhibits the constrained access as herein defined and is to be regarded as having a Constraint Index of 1 to 12. Also contemplated herein as having a Constraint Index of 1 to 12 and therefore within the scope of the novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value of 1 to 12. Thus, it should be understood that the Constraint Index value as used herein is an inclusive rather than an exclusive value. That is, a zeolite when tested by any combination of conditions within the testing definition set forth hereinabove and found to have a Constraint Index of 1 to 12 is intended to be included in the instant catalyst definition regardless that the same identical zeolite tested under other defined conditions may give a Constraint Index value outside of 1 to 12.

For ZSM-5 type zeolites of very high silica to alumina ratio, such as 1600:1, the Constraint Index cannot be measured reliably because of the low activity of the zeolite. In such cases reliance on X-ray pattern is useful. Many such zeolites, after activation by the method of this invention, become active enough to make Constrain Index evaluation feasible.

The class of zeolites defined herein is exemplified by ZSM-5, ZSM-11, ZSM-12, ZSM-21 ZSM-23, ZSM-35, ZSM-38, ZSM 48, and other similar materials. U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire contents of which is incorporated herein by reference.

ZSM-21 is more particularly described in U.S. Pat. No. 4,046,859, the entire contents of which is incorporated herein by reference.

ZSM-23 is more particularly described in U.S. Pat. No. 4,076,842, the entire contents of which is incorporated herein by reference.

ZSM-35 is more particularly described in U.S. Pat. No. 4,016,245, the entire contents of which is incorporated herein by reference.

ZSM-38 is more particularly described in U.S. Pat. No. 4,046,859, the entire contents of which is incorporated herein by reference.

The specific zeolites described, when prepared in the presence of organic cations, are substantially catalytically inactive, possibly because the intra-crystalline free space is occupied by organic cations from the forming solution. These cations are removed by heating in an inert atmosphere at 1000° F. for one hour, for example, followed by base exchange with ammonium salts followed by calcination at 1000° F. in air.

The ZSM-5 type zeolites referred to herein have a crystal framework density, in the dry hydrogen form, of not less than about 1.6 grams per cubic centimeter. The dry density for known crystal structures may be calculated from the number of silicon plus aluminum atoms per 1000 cubic Angstroms, as given, e.g., on Page 19 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unkown, the crystal framework density may be determined by classical pycnometer techniques. For example, it may be determined by immersing the dry hydrogen form of the zeolite in an organic solvent not sorbed by the crystal. Or, the crystal density may be determined by mercury porosimetry, since mercury will fill the interstices between crystal but will not penetrate the intracrystalline free space.

Crystal framework densities of some typical zeolites which may be modified by the method of this invention, including some which are not within the purview of this invention, are:

TABLE VII

| Zeolite | Void Volume | Framework Density |
|---|---|---|
| Ferrierite | 0.28 cc/cc | 1.76 g/cc |
| Mordenite | .28 | 1.7 |
| ZSM-5, 11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4, Omega | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The preferred crystals that are treated by the method of this invention may be incorporated in another material usually referred to as a matrix or binder. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina and silica-magnesia. The matrix may be in the form of a cogel. The relative proportions of zeolite component and inorganic oxide gel matrix on an anhydrous basis may vary widely with the zeolite content ranging from between about 5 to about 99 percent by weight and more usually in the range of about 10 to about 80 percent by weight of the dry composite.

The term "acid catalytic activity" as used herein refers to the effectiveness of the zeolite, when in suitable form, for catalyzing reactions known to be promoted by so-called acid catalysts. Catalytic cracking, hydrocracking, skeletal isomerization catalytic dewaxing, and various aromatic hydrocarbon reactions such as alkylation, dealkylation, isomerization and disproportionation, are hydrocarbon conversion reactions which fall in the category of acid catalyzed reactions. Other reactions, such as alcohol dehydration, are also in this class.

As is known in the art, the acid catalytic activity of a zeolite may be measured by its "alpha value", which is the ratio of the rate constant of a test sample for cracking normal hexane to the rate constant of a standard reference catalyst. Thus, an alpha value $=1$ means that the test sample and the reference standard have about the same activity. The alpha test is described in U.S. Pat. No. 3,354,078 and in The Journal of Catalysis, Vol. IV, pp. 522–529 (August 1965), both of which are incorporated herein by reference. Measurement of the "alpha value" is useful to assess the extent of catalyst activity before treatment, and also the degree of activation achieved with any sample treated by the method of this invention. For this purpose, the zeolite is converted to the hydrogen form before evaluation. However, other conversions also may be used to assess catalytic activity, and the zeolite need not always be in the hydrogen form, as illustrated above by Examples 24–25 wherein methanol conversion is used.

The method of this invention is believed to effect insertion of aluminum into the robust framework of the zeolite, without substantial change of the crystal structure, i.e. a ZSM-5 type zeolite product is produced. The increased ion-exchange capacity of the product may be measured by ordinary ion-exchange techniques, or by temperature programmed desorption of ammonia. The ammonia desorption/TGA technique is described in a publication by G. T. Kerr in Thermochemica Acta, the contents of which are incorporated herein by reference.

The products produced by this invention may be converted to the hydrogen or to any other form suitable for a particular application by methods known to those skilled in the art.

The preformed, high silica-content crystalline inorganic solid that may be modified by the method of this invention may be any crystalline solid of the type described including the preferred zeolites, and which have a silica to alumina mol ratio greater than about 10 and further characterized by a measureable content of silica extractable by a solution of sodium hydroxide.

The most simple test for the presence of extractable silica is to place a 1 gram sample of the calcined zeolite crystals, in the absence of added activating oxide and in the ammonium form, in 50 ml of 1N solution of sodium hydroxide and allow it to stand at room temperature for about 72 hours. If the crystal dissolves either partially or completely, this is a clear test showing the presence of extractable silica. Another method which is useful is to suspend the crystals as the hydrogen form in demineralized water and to conductimerically titrate at moderately elevated temperature with 0.1N sodium hydroxide. Apparent consumption of sodium hydroxide in excess of the measured ion-exchange capacity (e.g., 1.5 to 2×) is evidence for the formation of sodium silicate in solution. The latter may be determined independently for confirmation.

While not wishing to be bound by theory, the experimental results are consistent with the concept that exctractable silica plays a role in the method of this invention by creating crystal defects for accommodating an available added minor element in the rigid framework, or in the alternative (when no added minor element is available) by permitting selective removal of silica with possible reorganization of the remaining framework elements.

There are several embodiments of the present invention, as illustrated by the examples given below. All of these result in a higher catalytic activity for acid catalyzed reactions, as indicated by the alpha test or by a specific conversion, and the ion exchange capacity measured as meq/gram of product is higher than the meq/gram of preformed crystals.

In general, modification by the method of this invention proceeds more rapidly if the preformed crystals are first freed of organic matter that may be present by calcination, or at least pyrolyzed in nitrogen, but even in the absence of such treatment the method is still effective. The modification proceeds more rapidly the higher the silica alumina content of the preformed crystals. And it proceeds much more rapidly at higher concentrations of hydroxyl ion, especially in the presence of an alkali metal cation. The presence of an activating metal oxide also facilitates the conversion to the modified product.

EXAMPLE 1A

A sample of zeolite ZSM-5 in the hydrogen form and having a structural silica:alumina ratio of 1600:1 is mulled by ball milling with 35 percent by weight of alpha-alumina monohydrate, adding sufficient deionized water to form a mixture which can be conveniently mulled. The mull is extruded into pellets (small cylinders of 1.6 mm diameter) and the pellets air dried at 110° C., precalcined in nitrogen at about 540° C. after which the zeolite is converted to the hydrogen form by ammonium cation exchange, air drying at about 110° C. and calcination in air at about 540° C. The alpha value of this catalyst is increased.

A sample of the catalyst is contacted with 100 percent steam at atmospheric pressure and at a temperature of 425° C. for 18 hours. The steam treated product has an alpha value which is further increased. After the measurement of the alpha value is made, the catalyst is regenerated by heating in air to 540° C. The alpha value of the regenerated catalyst is not significantly reduced by the regeneration.

EXAMPLE 2A

HZSM-5 extrudate was prepared by mulling 1600:1 as synthesized ZSM-5 with 35% alpha alumina monohydrate with added deionized water, extruded (1/16") dried at 230° F., precalcined in nitrogen at 1000° F., to decompose the template, ammonium exchanged and air dried at 230° F., and calcined in air at 1000° F. The alpha value of this catalyst was 7.7.

A sample of this catalyst was contacted with 100% steam at one atmosphere and 800° F. for 18 hours. The steam treated product was found to have an alpha value of 17.6. After alpha measurement the catalyst was air regenerated at 1000° F. Regeneration at 1000° F. gave an alpha value of 17.4 A Constrained Index (C.I.) of 1.6 at 850° F. was obtained for the steamed extrudate. The C.I. value obtained is consistent with conventional ZSM-5 type catalysts, indicating that the enhanced activity is due to additional stable sites formed within the internal pores of the zeolites.

EXAMPLE 3A

A sample of the binder-free 1600:1 zeolite ZSM-5 of Example 2 was obtained in the hydrogen form by ammonium exchange of the air calcined as-synthesized zeolite, followed by air calcination of the ammonium ZSM-5 at about 540° C. The binder-free zeolite was then treated in 100% steam at atmospheric pressure at 425° C. for varying periods of time, after which the activity of the catalyst was determined. The results are shown in Table I below.

TABLE I

| Steaming Time (hrs.) | Alpha Activity |
| --- | --- |
| 0 | 6.1 |
| 6 | 7.2 |
| 18 | 7.6 |
| 45 | 7.2 |
| 94 | 7.0 |

These results, in comparison with those of Example 2, show that the presence of the binder is necessary for the activation to occur.

EXAMPLE 4A

Two parts of the binder-free 1600:1 zeolite ZSM-5 of Example 2 in the hydrogen form produced by the air calcination of the ammonia form zeolite were mixed well with one part of alpha-alumina momohydrate and the mixture was then pelletized and steamed for 18 hours in 100% steam at atmospheric pressure and 425° C. The alpha value of the steamed catalyst was 6.7, showing that mere admixture of the zeolite and the binder is insufficient for activation.

EXAMPLE 5A

The 1600:1 zeolite ZSM-5 of the preceding Examples in the ammonium form was mulled with 35% alpha alumina monohydrate by ball milling after which the mixture was extruded into 1.6 mm cylindrical pellets The extruded catalyst was then dried in air at 120° C., precalcined in nitrogen at 540° C., followed by an ammonium exchange, air drying at 120° C., air calcination and steaming for 18 hours at 425° C. under atmospheric pressure. The alpha value of the steamed catalyst was 12.3, a substantial increase over the original alpha value of 6.1.

The catalyst was then steamed for an additional hour at 540° C. and under atmospheric pressure, after which the alpha value was found to be 12.1, consistent with a theoretical prediction of 12.0.

EXAMPLE 6A

ZSM-5 having a silica to alumina ratio of 70:1 and in the as-synthesized form was mulled with 35 wt% alpha alumina monohydrate and extruded. The extrudate was calcined and ammonium exchanged.

A retained portion of a similarly prepared batch of 70:1 crystals was calcined, ammonium exchanged and the Bronsted acid site content was found to be 0.47 MEQ H/gm, i.e., 0.47 milliequivalents of hydrogen per gram of zeolite. The Bronsted acidity of the extrudate also was found 0.47 MEQ H/gm zeolite. The 70:1 ammonium extrudate is identified below as Extrudate 1.

The Bronsted acidity of retained portions of the 1600:1 binder-free ammonium form of ZSM-5 from Example 5, and of the 1600:1 ammonium form extrudate (Extrudate 2) from the same example were also determined. The binder free was found to have 0.02 MEQ H/gm zeolite, and Extrudate 2, 0.057 MEQ H/gm zeolite.

All of the above determinations of acidity were made by TGA filtration.

EXAMPLE 7A

Extrudate 1 and Extrudate 2 from Example 6 were calcined in 20% air mixed with 80% nitrogen at a high flow rate to convert the extrudates to the hydrogen form. Each was then steamed at 800° F. in 1 atm. steam for 14.5 hours, after which alpha values and acid site densities were evaluated. The results are shown in Table II.

TABLE II

| | Alpha Value | Bronsted Activity (MEQ H/gm zeolite) |
| --- | --- | --- |
| Untreated Extrudate 1 | 254 | 0.47 |
| Hydrothermally-treated Extrudate 1 | 151 | 0.33 |
| Untreated Extrudate 2 | 7.7 (estimated) | .057 |
| Hydrothermally-treated Extrudate 2 | 15 | 0.13 |

EXAMPLES 1B to 4B

ZSM-5 (65 parts by weight) is wet milled with α-alumina monohydrate (35 parts) extruded into cylindrical pellets having a diameter of about 2 mm., dried, calcined and each sample is covered with water in an open tube. The products are exchanged with 1N NH$_4$NO$_3$ by conventional methods and calcined prior to treating. The results are tabulated below:

| Example No. | Temp. (°C.) | Time | Acid Activity (α) | Notes |
| --- | --- | --- | --- | --- |
| 1 | 165 | 1 day | 41 | — |
| 2 | 100 | 8 days | 4.5 | — |
| 3 | 170 | 1 day | 33 | H$_2$O loss |
| 4 | 173 | 14 hrs. | 23 | — |

EXAMPLES 5B-7B

The above procedure is repeated except that different samples are treated simultaneously in a sealed autoclave at 130° C. for 64 hours and then at 170° C. for 24 hours. Control example 8 contains no alumina and consists of HZSM-5 (α=0.015). Example 6 is an extruded mixture of the particulate zeolite and alpha-alumina monohydrate binder in equal weight portions. Example 7 is an equal mixture of the zeolite with gamma-alumina beads slurried with water.

| Example No. | Alumina | Treatment | Activity (α) |
|---|---|---|---|
| 5 | nil | none | 0.015 |
| 6 | binder | hydrothermal | 41 |
| 7 | beads | hydrothermal* | 7 |

*Loss of H₂O indicated. Beads separated from treated zeolite prior to activity test.

This comparative experimentation shows the greater enhancement which is obtained by more intimate contact between the solid materials.

EXAMPLE S 8B to 11B

The procedure of Example 7 is repeated using an admixture of HZSM-5 and α-Al₂O₃ beads, except that the standard heating period is 1 day.

| Example No. | Temp. (°C.) | Activity | Note |
|---|---|---|---|
| 8 | 165 | 7 | — |
| 9 | 100 | 0.3 | — |
| 10 | 170 | 2 | H₂O Loss |
| 11 | 165 | 0.5 | Steam Only |

Examples 8, 9 and 10 show how hydrothermal treatment in contact with an aqueous liquid can improve activity markedly (14×), as compared to steaming, where the role of water as a transport medium is necessarily restricted. By fully covering the catalyst with water during hydrothermal treatment enhancement is maximized.

EXAMPLE 12B

The alumina-HZSM-5 extruded composition of Examples 1–4 is ammonium exchanged and calcined. An aliquot of the alumina-bound catalyst is treated at 228° C. with flowing undiluted unpressurized steam for 20 hours and exchanged with 1N NH₄NO₃. The comparative results of several examples are given below.

| Example No. | Temp °C. | Pressure | Treatment | Time | Cat. Activity |
|---|---|---|---|---|---|
| 2 | 100 | 1 atmo. | Hydrothermal | 8 days | 4.5 |
| 4 | 173 | 125 psi | Hydrothermal | 14 hours | 23 |
| 12 | 228 | 1 atmo. | steam | 20 hours | 1.6 |
| control | — | — | none | — | 1.4 |

The comparative data show that steaming at atmospheric pressure is substantially ineffective at 228° C.; whereas hydrothermal treatment in aqueous media shows significant increase in the α-value at only 100° C. and autogenous pressure.

EXAMPLE 13B

A high silica ZSM-5 composite catalyst is made by mixing 65 parts by weight of ZSM-5 zeolite (SiO₂:Al₂O₃ =2327:1) with 35 parts by weight (dry calcined basis) of alpha aluminum monohydrate (Kaiser) and mulled with sufficient water to form an extrudable mass. After forming 1/16" extrudate composite, the catalyst is dried and precalcined at 1000° F. (540° C.) in nitrogen atmosphere for three hours. The calcined composite is ion exchanged with 1 N ammonium nitrate, dried and calcined again to obtain the hydrogen form. The exchanged catalyst contains 0.09% Na and has an alpha value of 2.

The hydrothermal treatment is conducted at 148 C (300° F.) for 24 hours in an autoclave, using about 5 volumes of water per volume of composite catalyst. The recovered catalyst is dried at (110° C.) (230° F.) and calcined at 540° C. (1000° F.) for three hours. The treated catalyst has an alpha activity of 38.

Significant increases in the alpha value may be obtained with zeolites having a silica to alumina ratio of 1600:1 or more. Commensurate results may be obtained with other zeolites of differing silica to alumina ratio. The enhancement in activity is believed to be caused by the creation of additional, stable active internal sites in the zeolite because after the hydrothermal treatment is complete, the Constraint Index remains consistent with that of the original zeolite structure although the alpha value has increased significantly. The catalyst thereof retains its original selectivity but with an improved acid activity.

The activated zeolite compositions produced by the present invention may be used as catalysts in acid catalyzed conversion reactions of the kind catalyzed by the type of zeolite used in the method. Hydrocarbon conversion reactions such as cracking, hydrocracking, alkylation, dealkylation, transalkylation, isomerization, polymerization, disproportionation and aromatization are particularly important but other reactions such as the conversion of oxygenates such as methanol or dimethyl ether to hydrocarbons are also of interest. The conditions employed in these reactions will be those appropriate to the particular catalyst being used, having due regard to its enhanced activity.

EXAMPLE 1C

Preparation of ZSM-5 containing about 50 ppm alumina (about 38,000:1 silica-to-alumina ratio)

ZSM-5 crystals were synthesized from a formulation containing tetraethylorthosilicate, sodium hydroxide, tetrapropylammonium bromide, and water at 212° F. with intensive agitation. Special precautions were taken to prevent alumina contamination from the crystallization equipment and the environment.

A 50 g quantity of the material was calcined in an ammonia atmosphere at 1000° F. for three hours to decompose the organic components in the zeolite. The product was pure white without any signs of a carbon residue. The NH₃ calcined material was subsequently purged with nitrogen and then air for one hour to remove any absorbed NH₃. The sodium content of the sample was reduced to 0.01 wt. % by treatment with a 0.1 N ammonium nitrate solution followed by hot water washing. The sample was then dried and its chemical composition was determined to be as follows:

| | |
|---|---|
| Al₂O₃, ppm | 50 |
| SiO₂, wt. % | 99 |
| Na, wt. % | 0.01 |
| N, wt. % | 0.05 |
| C, wt. % | 0.03 |
| Ash, wt. % | 99.6 |

EXAMPLE 2C

A portion of a zeolite produced in accordance with Example 1 was calcined in a muffle furnace at 1000° F. for three hours, sized to 30-60 mesh, and 2.5 g (4.8 cc) were charged to a 5/16" ID stainless steel microreactor. The ZSM-5 was treated in situ with hydrogen at 900° F. for one hour. Propylene, admixed with 50 volume percent of hydrogen, was then passed over the catalyst at 500 psig (total pressure-1000 psig), 0.4 WHSV, 400° F. for two hours. No $C_6+$ liquid product was obtained.

EXAMPLE 3C

Conversion of Propylene over a physical mixture of 50 ppm $Al_2O_3$ ZSM-5 and alumina A mixture of 1.63 g (2.9 cc) 50 ppm $Al_2O_3$ ZSM-5 plus 0.87 g (1.8 cc) alpha alumina monohydrate, both sized to 30-60 mesh and calcined at 1000° F. for three hours, was charged to the reactor and treated again in situ with hydrogen at 1000° F. for one hour. Propylene was then passed over the catalyst under the same conditions as in Example 2 for successive periods of 16½ and 22½ hours. Again, no $C_6+$ liquid was formed.

EXAMPLE 4C

Preparation of 50 ppm $Al_2O_3$ ZSM-5 with 35 wt. % alumina binder

The 50 ppm $Al_2O_3$ ZSM-5, as synthesized, was mulled with 35 wt. % alpha alumina monohydrate with added deionized water, extruded (1/16") at 25 t/in² pressure, dired at 230° F., precalcined in ammonia for three hours at 1000° F., ammonium exchanged to insure sodium content less than 0.02 wt. %, dried at 230° F., and calcined in air for three hours at 1000° F.

EXAMPLE 5C

Propylene Over 50 ppm $Al_2O_3$ with 35 wt. % alumina binder

A 2.50 g quantity of the product from Example 4, sized to 30-60 mesh, was charged to the reactor, treated with hydrogen in situ for one hour at 900° F. Then propylene was passed over the catalyst under the conditions of Examples 2 and 3. Results are shown below:

| Yields | | |
|---|---|---|
| Material Balance Time, Hrs. | 19½ | 22 |
| Time on Stream, Days | 0.8 | 0.9 |
| Yields, wt. % | | |
| $C_1 + C_2$ | 0.1 | 0.1 |
| $C_3=$ | 22.7 | 22.7 |
| $C_3$ | 2.4 | 3.0 |
| $C_4$'s | 1.2 | 1.4 |
| $C_5$'s | 1.8 | 1.4 |
| $C_6+$ | 71.9 | 71.4 |
| | 100.0 | 100.0 |

The $C_6+$ liquid from the two runs was composited and distilled to give 28.6 wt. % 330° F.⁻ gasoline and 42.9 wt. % 330° F.⁺ fuel oil. The gasoline had an octane number (R+O) of 94 and the fuel oil a pour point of −70° F., diesel index 67.

| | 330° F.⁻ Gasoline |
|---|---|
| Yield, wt. % | 28.6 |
| Gravity, °API | 64.7 |
| Gravity, specific | 0.7213 |
| O.N., R + O | 94 |
| Boiling Range, °F. | |
| 5% | 132 |
| 50% | 267 |
| 95% | 328 |

| | 330° F.⁺ Distillate (Fuel Oil) |
|---|---|
| Yield, wt. % | 42.9 |
| Gravity, °API | 42.7 |
| Gravity, specific | 0.8123 |
| Pour Point, °F. | −75 |
| Aniline No. | 157.2 |
| Diesel Index | 67 |
| Hydrogen, wt. % | 13.93 |
| Carbon | 86.15 |
| H/C Ratio | 1.92 |
| Boiling Range, °F. | |
| 5% | 339 |
| 50% | 458 |
| 95% | 651 |

EXAMPLE 6C

Waxy Lube Raffinate Charge

A furfural extracted, waxy heavy neutral lube stock, designated Coryton 0048 raffinate, was processed over the catalysts of Examples 1 and 4 at 1 LHSV, 400 psig, 2500 SCF hydrogen/bbl. Results are compared below with a conventional ZSM-5 catalyst (1% Ni on 70/1 $SiO_2/Al_2O_3$ ZSM-5 with 35% alumina binder, steamed to an Alpha Value of 70).

| | Lube Dewaxing | | | |
|---|---|---|---|---|
| Catalyst | | Mixture* Example 1 + $Al_2O_3$ | Example 4 | Conventional Catalyst |
| Temperature, °F. | | 650 | 651 | 551 |
| Material Balance Time, Hrs. | CHARGE | 18½ | 18 | 18 |
| Yields, wt. % | | | | |
| $C_1 + C_2$ | | LIQUID | 0.1 | 0.1 |
| $C_3$ | | PRODUCT | 0.9 | 2.2 |
| $C_4$ | | | 2.5 | 3.8 |
| $C_5$ | | | 1.8 | 2.1 |
| $C_6$-650° F. | | | 9.4 | 8.8 |
| 650° F.+Lube | | | 85.1 | 82.8 |
| 650° F. Lube Properties | | | | |
| Gravity, °API | 29.1 | | 28.4 | 28.5 |
| Gravity, specific | 0.8811 | | 0.8849 | 0.8844 |
| Pour Point, °F. | 115 | 115 | +20 | +10 |

-continued

Lube Dewaxing

| Catalyst | Mixture* Example 1 + Al$_2$O$_3$ | Example 4 | Conventional Catalyst |
|---|---|---|---|
| KV @ 40° C., cs | — | 95.08 | 109.0 |
| KV @ 100° C., cs | 9.91 | 10.77 | 11.42 |
| V.I. | — | 96.3 | 90.0 |

*Physical mixture of 1.7 g (3.0 cc) Example 1 plus 0.9 g (1.8 cc) alumina.

The 50 ppm Al$_2$O$_3$ catalyst had essentially no lube catalytic dewaxing activity. Addition of the alumina binder (Example 4) imparts activity with no adverse effect on the ZSM-5 shape selectivity as indicated by the pour point-viscosity index relationship. In this example it is less active but more selective than the standard conventional catalyst, i.e. gives a higher viscosity index at about the same pour point.

EXAMPLES 7C–8C

The following examples will illustrate that the use of zeolites having a significant amount of alumina, i.e. a silica/alumina mole ratio of are not readily activated by mixing with binder, but rather, their activity is diluted.

Example 7C

70/1 SiO$_2$/Al$_2$O$_3$ ZSM-5 2.5 wt Al$_2$O$_3$, 25,000 ppm

Propylene was passed over the 70/1 SiO$_2$/Al$_2$O$_3$ ZSM-5 catalyst, with and without 35% alumina binder under the same conditions as those used in Examples 2, 3 and 5. Results are listed below:

| Catalyst | No Binder | 35% Alumina Binder |
|---|---|---|
| Temperature, °F. | 401 | 400 |
| WHSV | 0.6 | 0.4 |
| Material Balance Time, Hrs. | 17 | 22.5 |
| Yields, Wt. % | | |
| C$_1$ + C$_2$ | 0.1 | 0.1 |
| C$_3$= | 1.2 | 2.0 |
| C$_3$ | 1.9 | 3.1 |
| C$_4$'s | 0.9 | 0.4 |
| C$_5$'s | 1.3 | 0.6 |
| C$_6$+ | 94.6 | 93.9 |
| | 100.0 | 100.0 |
| Liquid Product Boiling Range, °F. | | |
| 5% | 246 | 221 |
| 10% | 314 | 266 |
| 30% | 453 | 368 |
| 50% | 539 | 446 |
| 70% | 604 | 525 |
| 90% | 733 | 641 |
| 95% | 786 | 709 |

It can be seen that the catalyst without binder was actually more active than that with binder, i.e. the liquid product had a higher boiling range. The binder in this case "dilutes" the concentration of ZSM-5 and thus decreases the activity of a given weight of final catalyst.

EXAMPLE 8C

In this example a ZSM-5 having a silica-to-alumina ratio of 1600:1 (about 0.10 wt. % alumina, or 1,000 ppm) was used. The waxy lube raffinate of Example 6 was processed over this 1600/1 SiO$_2$/Al$_2$O$_3$ ZSM-5, with and without 35% alumina binder. Conditions were again the same as those used in that example.

| Catalyst | No Binder* | 35% Alumina Binder |
|---|---|---|
| Temperature, °F. | 651 | 650 |
| Material Balance Time Hrs. | 19 | 18 |
| Yields, wt. % | | |
| C$_1$ + C$_2$ | 0.1 | 0.1 |
| C$_3$ | 1.6 | 2.1 |
| C$_4$ | 2.9 | 5.0 |
| C$_5$ | 1.8 | 2.7 |
| C$_6$ −650° F. | 10.7 | 13.7 |
| 650° F.+ Lube | 82.5 | 76.2 |
| 650° F.+ Lube Properties | | |
| Gravity, °API | 27.4 | 27.1 |
| Specific | 0.8905 | 0.8922 |
| Pour Point, °F. | −20 | +10 |
| KV @ 40° C., cs | 113.9 | 109.1 |
| KV @ 100° C., cs | 11.44 | 11.21 |
| V.I. | 84.6 | 86.2 |

*Physical mixture of ZSM-5 plus alumina, alumina equal in weight to that present in bound catalyst From the above example, it can be seen that a binder is not necessary for generation of an active catalyst at this alumina level, and in fact, the presence of alumina actually dilutes the activity of the catalyst without the binder.

EXAMPLE 9C

The procedure of Example 4 was repeated with the sole exception that no water was used in mulling the aluminum with a high silica ZSM-5.

EXAMPLE 10C

In this example alumina alone was mulled with added water (no high silica zeolite) and then the high silica zeolite of Example 2 was wetted with the extract liquid and thereafter processed in identical manner to Example 2, i.e. ammonium precalcination for three hours at 1000°, base exchanged with an ammonium solution to reduce the sodium content to 0.02 wt. % followed by air calcination.

EXAMPLE 11C

This example consisted of the use of 100% Kaiser alumina binder alone in order to completely eliminate the possibility that alumina itself was responsible for any catalytic activity.

The catalysts of Examples 9, 10 and 11 were evaluated for the conversion of propylene under conditions recited in Examples 2 and 3 and the results are shown in the following table together with results from some of the previously referred to examples.

TABLE

| Example | Pure Crystals 2 | Conversion of Propylene | | | | Alumina alone 11 |
|---|---|---|---|---|---|---|
| | | Physical Mixture With Binder 3 | Dry-Mulled With Binder 9 | Wetted With $H_2O$ Extract With Binder 10 | Wet-Mulled With Binder 4 | |
| WHSV, on total Material Balance | 0.4 | 0.6 | 0.6 | 0.6 | 0.5 | 0.6 | 0.5 |
| Time, Hrs. | 2 | 15 | 18 | 18 | 19.5 | 18.5 | 2 |
| $C_3 =$ Conversion, wt % | 16 | 15 | 16 | 5 | 77 | 77 | 55 |
| Yields, wt % | | | | | | | |
| $C_1 + C_2$ | 0.1 | 0.5 | 0.1 | — | — | 0.3 | — |
| $C_3 =$ | 84.0 | 85.5 | 83.6 | 95.2 | 22.7 | 22.6 | 45.4 |
| $C_3$ | 7.9 | 13.3 | 3.3 | 0.9 | 2.4 | 1.8 | 53.8 |
| $C_4 + C_5$ | 8.0 | 0.7 | 8.2 | 2.7 | 3.0 | 3.0 | 0.8 |
| $C_6+$ | 0.1 | 0.1 | 4.8 | 1.1 | 71.9 | 72.3 | — |
| | 100.0 | 100.0 | 100.0 | 100.0 | 100.0 | 100.0 | 100.0 |
| 330° F. + Distillate % of Liq. Prod. | — | — | — | — | 56 | — | — |

From the above table, the pure crystals, i.e. Example 2 made no liquid product. The physical mixture, i.e. Example 3, eliminated the possibility that the high silica ZSM-5 and the alumina particles as such are interacting and the dry mulling experiment, i.e. Example 9, eliminates ammonium exchange in the final calcination as being involved in the generation of active sites. The water extract experiment, i.e. Example 10, eliminates room temperature wet mulling as a possible source of dissolved alumina entering the ZSM-5 pores. The alumina only experiment, i.e. Example 11, also made no liquid product and as such this result confirms the fact that the binder as such in the wet mulled catalyst is not making liquid product at 400° F.

EXAMPLES 12C-14C

Another series of examples were carried out in order to illustrate the criticality of the use of water during the mulling of the high silica zeolite with the alumina. In all of these examples, 65 wt. % of the ultra low alumina zeolite of Example 1 was used and the binder was 35 wt. % alpha alumina monohydrate. Each sample was treated after forming in accordance with the procedure of Example 4. Examples 12 and 14 did not use water. Example 13 did use water but no hydraulic pressure.

The compositions were evaluated together for Alpha activity.

As is known in the art, the Alpha Value is an approximate indication of the catalytic cracking activity of the catalyst compared to a standard catalyst and it gives the relative rate constant (rate of normal hexane conversion per volume of catalyst per unit time). The Alpha test is described in U.S. Pat. No. 3,354,078 and in The Journal of Catalysis, Vol. IV, pp. 522-529 (August 1965).

The results are shown in the following table along with a comparison with the catalyst of Example 4.

TABLE

| Example | 12 | 13 | 14 | 4 |
|---|---|---|---|---|
| Method of Incorporation | Dry Mulling[1] and Hand Pressing | Wet Mulling[1] and Hand Pressing | Dry Mixing[2] and Hand Pressing | Wet Mulling[1] Hydraulic Extrusion (at 25 ton pressure[3]) |
| Alpha Activity | 0.25 | 1.0 | 0.13 | 5.7 |

[1]Mulling - Mix in a muller (Cincinnati Muller Co.) for 10-15 minutes with or without water
[2]Mixing - Mechanical mixing with no kneading action
[3]Extrusions - Extrusion using a hydraulic RAM extruder As can be seen, the preparation without water, i.e. Examples 12 and 14, resulted in very low Alpha Values—even though the ammonia precalcination, ammonium exchange and air calcination were carried out. However, the preparations with water gave enhanced results.

EXAMPLES 15C-16C

Examples 15 and 16 illustrate the effect of time and temperature of ammonia precalcination on alpha activity and a comparison is made with the catalyst of Example 4. In each of Examples 15 and 16, the procedure of Example 4 was followed.

The results and operation conditions are shown in the following table.

TABLE

| Example | 15 | 4 | 16 |
|---|---|---|---|
| Precalcination | | | |
| Temperature, °F. | 800 | 1000 | 1200 |
| Time, Hr. | 8 | 3 | 3 |
| Atmosphere | $NH_3$ | $NH_3$ | $NH_3$ |
| Alpha Activity | 0.5 | 5.7 | 3.0 |

EXAMPLES 17C-18C

Examples 17 and 18 show the effect of binder concentration on activation.

In each of Examples 17 and 18 the exact procedure of Example 4 was followed with the exception of varying the binder content. Note that the binder has a surprising effect on activity.

The results and specific formulations are shown below together with the catalyst of Example 4.

TABLE

| Example | 17 | 4 | 18 |
|---|---|---|---|
| Zeolite/Binder (wt. basis) | 90/10 | 65/35 | 10/90 |
| Alpha activity | 0.40 | 5.7 | 3.0 |
| Alpha activity, Normalized* | 0.24 | 5.7 | 19.5 |

*Normalized to unit weight of zeolite based on 65/35 wt. ratio.

EXAMPLE S 19C–22C

These examples show that ZrO$_2$ and TiO$_2$ as binder material impart significant Alpha activity compared to Al$_2$O$_3$, using mortar and pestle mixing and pressing as the method of incorporation (insufficient material for hydraulic extrusion). SiO$_2$ as a binder has essentially no effect on Alpha activity.

Details of the preparation of these materials are described below.

EXAMPLE 19C

Zirconia Binder

As synthesized ultra low Al ZSM-5 zeolite was intimately mixed with a zirconia gel of 25% solution by weight (from duPont Chemical). The weight ratio of ZSM-5 to ZrO$_2$ was adjusted to 65/35. The mixture was then dried and calcined in a NH$_3$ stream at 1000° F. for three hours. The Na content in the material was then exhanged with 1 N NH$_4$/NO$_3$ solution to reduce to less than 0.05%. The sample was then sized to 14/25 mesh size material and calcined to 1000° F. in air for three hours.

EXAMPLE 20C

Titania Binder

Preparation procedure and catalytic test method of the catalyst are similar to that in Example 19 except that 25% titania gel (from duPont Chemical) was used instead of ZrO$_2$ gel.

EXAMPLE 21C

Silica Binder

Preparation procedure and catalytic test method of the catalyst are similar to that in Example 19 except that 30% colloidal SiO$_2$ (from duPont Chemical) was used instead of ZrO$_2$ gel.

EXAMPLE 22C

Alumina Binder

Same as Example 19, except Kaiser alpha alumina monohydrate was used.

The results are shown in the following table together with the results obtained with the composition of Example 1.

TABLE

| Example | 19 | 20 | 21 | 22 | 1 |
|---|---|---|---|---|---|
| Binder Material | ZrO$_2$ | TiO$_2$ | SiO$_2$ | Al$_2$O$_3$ | None |
| Zeolite/Binder (wt. basis) | | | 65/35 | | Pure Zeolite |
| Method of Incorporation | | Mortar and Pestle Mix and Hand Pressing | | | |
| Alpha Activity | 0.72 | 0.77 | 0.28 | 0.51 | 0.2 |

EXAMPLE S 23C–25C

These examples illustrate that the mesh size of the catalyst is not critical.

In each of Examples 23C-25C, the catalyst prepared by the process of Example 4 was ground to different mesh size and the Alpha activity measured.

The results are shown in the following table.

TABLE

| Example | 23 | 24 | 25 |
|---|---|---|---|
| Mesh Size of Catalyst | 12–14 | 14–25 | 25–40 |
| Alpha Activity | 5.8 | 5.7 | 5.2 |

EXAMPLE 1D

A 2 g. sample of NaZSM-5/Al$_2$O$_3$ extrudate (zeolite silica:alumina ratio of 70:1) was found to be essentially inactive, having an alpha value for the zeolite of 0.15. In the hexadecane cracking test, the conversion was less than 1 percent.

After steaming the extrudate at 400° C. overnight, the conversion in the hexadecane cracking test was 19.7 percent. After steaming at 500° C., the conversion was 45.4 percent.

EXAMPLE 2D

An inactive, binder-free sample of another NaZSM-5 silica:alumina ratio of 70:1) was found to have a hexadecane conversion of less than 1 percent. After steaming this zeolite on its own at 500° C. overnight, the conversion remained below 1 percent.

The zeolite (1.3 g.) was mixed with gamma alumina (0.7 g.) and steamed at 500° C. overnight. The activity in the hexadecane cracking test was found to be 54.8 percent.

EXAMPLE 3D

A high pour point crude oil (pour point over 15° C.) is passed over a steamed NaZSM-5/Al$_2$O$_3$ extrudate (65% zeolite, 35% alumina) at 350° C., 1 WHSV in 2170 kPa hydrogen. The dewaxed oil obatined in better than 90% yield is found to have a pour point below −32° C.

EXAMPLE 1E

A 2-g. sample of ZSM-5 zeolite having a silica-to-alumina ratio of about 26,000 and a sodium content of about 0.23 weight percent was impregnated with 3 grams of 5 weight percent sodium aluminate solution and calcined in air at 538° C. for 20 hours.

EXAMPLE 2E

The product of Example 1 was treated with a 1-N 8 weight percent solution of ammonium nitrate.

EXAMPLE 3E

A sample of the same ZSM-5 used above was vacuum impregnated with a solution of sodium aluminate which was diluted by an equal volume of concentrated (12N) NH$_4$OH. The pH was 12.4. After 30 minutes, the sample was dried and submitted to three cycles of 1N NH$_4$N$_3$ treatment followed by hot water washing. The sample was dried and calcined at 538° C. prior to testing.

The products of Examples 1E-3E were evaluated for alpha activity.

As is well known in the art, the alpha value gives an approximate indication of the catalytic cracking activity of the catalyst compared to a standard catalyst, and it is the relative rate constant of normal hexane conversion per unit volume of oxides per unit time. It is based on the activity of highly active silica-alumina cracking catalysts taken as an alpha of 1, and this test is described in U.S. Pat. No. 3,354,078 and the Journal of Catalysis, Vol. 4, pp. 522–529, August 1965.

The results are shown in the following table:

TABLE 1

| Activity of High SiO$_2$ ZSM-5 After Treatment | | |
|---|---|---|
| Example | | Alpha |
| 1 | NaAlO$_2$ treat | 0.4 |
| 2 | NaAlO$_2$/NH$_4$NO$_3$ treat | 0.2 |
| 3 | NaAlO$_2$/NH$_4$OH imp + NH$_4$NO$_3$ treat | 12 |

From the above table, it can be seen that the novel process of this invention resulted in a dramatic increase of activity. The procedure of Examples 1 and 2 did not result in any significant improvement, whereas the process of this invention (Example 3) did enhance activity.

EXAMPLE 1F

Three different high silica-containing zeolites of ZSM-5 type are treated with a solution which was prepared by dissolving 2.55 grams of sodium hydroxide, 10.0 grams of tetrapropylammonium bromide and 7.2 grams of Al$_2$(SO$_4$)$_3$ . 14 H$_2$O and 115 grams of water. The hydro-treating conditions are maintained at 100° C. (212° F.) for 6 hours at 1 atmosphere pressure. The solution to zeolite weight ratio is 3.4 parts of solution per part of zeolite and its pH is 9.9.

Zeolite A is a ZSM-5 zeolite having a silica:alumina ratio of 500:1 Zeolite B is a ZSM-5 zeolite having a silica:alumina ratio of 1600:1 and Zeolite C is a ZSM-5 zeolite having a silica:alumina ratio in excess of 30,000:1.

Zeolites A and B, having silica-to-alumina ratios of 500 and 1600 are precalcined in nitrogen at 540° C. (1000° F.) for 3 hours prior to treatment. Zeolite C was used as crystallized without pre-calcination. After the three zeolites have been hydrotreated in accordance with the above procedures, they are processed into their active form by calcination in nitrogen at 540° C. (1000° F.), followed by ammonium exchange with an aqueous solution of ammonium nitrate at ambient temperatures to remove excess aluminum ions. Finally, all materials are air calcined at a temperature of 540° C. (1000° F.) for three hours. The three zeolites, before and after treatment, are evaluated for hydrocarbon cracking activity (alpha-value, "α'").

As is well known in the art, the alpha value gives an approximate indication of the acid catalytic cracking activity of the catalyst compared to a standard catalyst, and it is the relative rate constant of normal hexane conversion per unit volume of oxides per unit time. It is based on the activity of active silica-alumina cracking catalysts taken as an alpha of 1, and this test is described in U.S. Pat. No. 3,354,078 and the Journal of Catalysis, Volume 4, pages 522-529, August 1965. The results obtained are shown in the following table:

TABLE 1

| Activity of High SiO$^2$ ZSM-5 After Treatment | | | |
|---|---|---|---|
| Material | A | B | C |
| Zeolite | ZSM-5 | ZSM-5 | ZSM-5 |
| SiO$_2$/Al$_2$O$_3$ | 500:1 | 1600:1 | 30,000:1 |
| Form | Acid (Calcined) | Acid (Calcined) | Acid (As Crystallized) |
| o(Untreated acid form) | 10 | 1.7 | 0.1 |
| T(Treated acid form) | 27 | 15 | 2.3 |
| Enhancement, T/o | 2.7 | 8.8 | 23 |

From the above table, it can be seen that the novel process of this invention resulted in a marked increase of activity. Thus, the ZSM-5 having a silica-to-alumina ratio of 500 had an alpha value of 10 prior to activation in accordance with the novel process of this invention, and thereafter its activity was raised to a value of 27. The effects of the alpha enhancement are more pronounced as the silica-to-alumina ratio increases.

COMPARATIVE EXAMPLES 2F-8F

The following comparative examples demonstrate that the simple addition of aluminum either by impregnation or exchange cannot achieve the activity enhancement of high silica zeolites.

EXAMPLE 2F

Four grams of type C low Al ZSM-5 (containing 50 ppm Al$_2$O$_3$) in its NH$_4$ form are impregnated with solution of 0.03 g Al (NO$_3$)$_3$ CH$_2$O in 2 g water. The wet zeolite mix is dried slowly, slugged and sized into 14/25 mesh. The resultant catalyst is activated at 540° C. (1000° F.) for three hours. The alpha value is 0.38.

EXAMPLE 3F

Zeolite C catalyst is treated in ammonium form in a manner similar to those described in Example 2 except using 0.15 g Al (NO$_3$)$_3$.9H$_2$O. The alpha value is 0.56.

EXAMPLE 4F

Ammonium Zeolite C is treated in a manner similar to Example 2 except using 0.3 g Al (NO$_3$)$_3$.9H$_2$O. The alpha value is 0.81.

EXAMPLE 5F

Zeolite C is treated by impregnating 4 g of Type C low alumina ZSM-5 in its NH$_4$ form with 0.13 g NaAlO$_2$ dissolved in 2 g of H$_2$O. The wet mix was dried at 110° C. (230° F.) for three hours and then calcined at 540° C. (1000° F.) for three hours. The Na content of the sample was reduced by NH$_4$ exchange. The sample was finally sized to 14/25 mesh and activated at 540° C. (1000° F.) for three hours again. The alpha activity of the sample was 0.1.

EXAMPLE 6F

This catalyst is prepared in a similar manner as described in Example 5 except that the "as crystallized" low alumina ZSM-5 is used as base material. The alpha value was 0.43.

EXAMPLE 7F

Four grams of "as synthesized" low alumina ZSM-5 is exchanged with a solution of 1.5 g Al(NO$_3$)$_3$.9H$_2$O in 20 ml of H$_2$O. After mixing for 2 hours the sample is filtered, washed and dried. The sample is then sized to 14/25 mesh and calcined at 1000° F. for three hours and then exchanged with NH$_4$NO$_3$ solution to remove Na to 0.02% wt. The catalyst is finally activated in air at 540° C. (1000° F.) for three hours. The alpha activity of the catalyst is found to be 0.24.

EXAMPLE 8F

This catalyst is treated in a similar manner to Example 7 except that 1.18 Al$_2$(OH)$_5$Cl is used instead of Al (NO$_3$)$_3$.9H$_2$O. The alpha activity of the catalyst was found to be 0.31.

The results obtained in Examples 2F-8F are shown in Table 2, wherein it is demonstrated that the results obtained are distinctly inferior to the claimed invention as illustrated in Table 1.

TABLE 2

| | Aluminum Addition to High Silica Zeolites | | | | | | |
|---|---|---|---|---|---|---|---|
| Example No. | 2 | 3 | 4 | 5 | 6 | 7 | 8 |
| Base Material | | | | | | | |
| Zeolite | | | | ZSM-5 | | | |
| SiO2/Al2O3 | | | | 30,000 | | | |
| Form | NH4 | NH4 | NH4 | NH4 | | As Crystallized | |
| Treating Agent | Al(NO3)3 | | | NaAlO2 | | Al(NO3)3 | Al2(OH)5Cl |
| Method of Treat | | Impregnation | | | | EXCH | EXCH |
| % Al2O3 Incorporated (Based on Zeolite) | 0.1 | 0.5 | 2 | 0.5 | 0.5 | 0.5 | 0.5 |
| Alpha of H Form Untreated | | | | | 0.2 | | |
| Treated | 0.38 | 0.56 | 0.81 | 0.2 | 0.43 | 0.24 | 0.31 |

EXAMPLES 1G TO 7G

ZSM-5 (65 parts by weight) is wet milled with α-alumina monohydrate (35 parts) extruded into cylindrical pellets having a diameter of about 2 mm., dried, calcined and each sample is covered with water in an open tube. The products are exchanged with 1N NH4NO3 by conventional methods and calcined prior to testing. The results are tabulated below:

| Example No. | Temp. (°C.) | Time | Acid Activity (α) | Notes |
|---|---|---|---|---|
| 1 | 165 | 1 day | 41 | — |
| 2 | 100 | 8 days | 4.5 | — |
| 3 | 170 | 1 day | 33 | H2O loss |
| 4 | 165 | 1 day | 195 | 1N.NaOH aq. solution |
| 5 | 165 | 1 day | 72 | 0.2N NaOH aq. solution |
| 6 | 25 | 1 day | 0.6 | 1N.NaOH aq. solution |
| 7 | 173 | 14 hrs. | 23 | — |

EXAMPLES 8G–10G

The above procedure is repeated except that different samples are treated simultaneously in a sealed autoclave at 130° C. for 64 hours and then at 170° C. for 24 hours. Control example 8 contains no alumina and consists of HZSM-5 (α=0.015). Example 9 in an extruded mixture of the particulate zeolite and alpha-alumina monohydrate binder in equal weight portions. Example 10 is an equal mixture of the zeolite with alpha-alumina monohydrate beads slurried with water.

| Example No. | Alumina | Treatment | Activity (α) |
|---|---|---|---|
| 8 | nil | none | 0.015 |
| 9 | binder | hydrothermal | 41 |
| 10 | beads | hydrothermal* | 7 |

*Loss of H2O indicated. Beads seperated from treated zeolite prior to activity test.

This comparative experimentation shows the greater enhancement which is obtained by more intimate contact between the solid materials.

EXAMPLES 11G TO 15G

The procedure of Example 10 is repeated using an admixture of HZSM-5 and —Al2O3 beads, except that the standard heating period is 1 day.

| Example No. | Temp. (°C.) | Activity | Note |
|---|---|---|---|
| 11 | 165 | 7 | — |
| 12 | 100 | 0.3 | — |
| 13 | 170 | 2 | H2O Loss |
| 14 | 165 | 0.5 | Steam Only |
| 15 | 165 | 81 | —N NaOH |

Examples 11G, 13G and 14G show how hydrothermal treatment in contact with an aqueous liquid can improve activity markedly (14×), as compared to steaming, where the role of water as a transport medium is necessarily restricted. By fully covering the catalyst with water during hydrothermal treatment enhancement is maximized.

EXAMPLES 16G TO 29G

A variety of activating agents are used to treat the HZSM-5 catalyst according to the standard procedure. Except as noted, equal parts by weight of zeolite and particulate activating agent are wet milled and treated in an excess of water at 165° C.

| Example No. | Act. Agent | Activity (α) | Note |
|---|---|---|---|
| 16 | B2O3 | 0.8 | 170°, 0.5 parts |
| 17 | NaAlO2 | 148 | 0.6 parts |
| 18 | TiO2 | 1.3 | 0.5 parts |
| 19 | Fe(NO3)3 | 0.3 | 170° |
| 20 | B2O3 | 0.5 | 0.7 parts |
| 21 | V2O5/SiO2* | 1.4 | 0.6 parts |
| 22 | Na3PO4 | 2.9 | 0.6 parts |
| 23 | NH4VO4 | 0.6 | 0.5 parts |
| 24 | K2CrO4 | 0.9 | 0.8 parts |
| 25 | Na2B4O7 | 1.6 | 0.7 parts |
| 26 | NaAlO2 | 27 | 0.1 parts H2O loss |
| 27 | NaAlO2 | 223 | 0.5 parts |
| 28 | Na2WO4 | 1.1 | 0.7 parts |
| 29 | Na2B4O7 | 1.1 | 0.1 parts |

*Girdler 101 catalyst K-promoted beads.

EXAMPLE 30G

The alumina-HZSM-5 extruded composition of Examples 1–7 is ammonium exchanged and calcined. An aliquot of the alumina-bound catalyst is treated at 228° C. with flowing undiluted unpressurized stream for 20 hours and exchanged with 1N NH4NO3. The comparative results of several examples are given below.

| Example No. | Temp °C. | Pressure | Treatment | Time | Cat. Activity |
|---|---|---|---|---|---|
| 2 | 100 | 1 atmo. | Hydrothermal | 8 days | 4.5 |
| 7 | 173 | 125 psi | Hydrothermal | 14 hours | 23 |

| Example No. | Temp °C. | Pressure | Treatment | Time | Cat. Activity |
|---|---|---|---|---|---|
| 30 | 228 | 1 atmo. | steam | 20 hours | 1.6 |
| control | — | — | none | — | 1.4 |

The comparative data show that steaming at atmospheric pressure is substantially ineffective at 228° C.; whereas hydrothermal treatment in aqueous media shows significant increase in the α-value at only 100° C. and autogenous pressure.

EXAMPLE 31G

The procedure of Example 1 is repeated except the hydrothermal treatment is conducted at 151° C. for 40 hours, giving an acid activity (α) =33.

The above data establishes the utility of the zeolite hydrothermal activation process for numerous different materials and process conditions. The unusually high alpha values obtained using alkaline conditions may be attributed to surface recrystallization of the zeolite during treatment. This is particularly noted in Examples 4, 5, 15, 17, 27, etc.

EXAMPLE 32G

The standard hydrotreating procedure is followed except the zeolite employed is a crystalline borosilicate prepared by the method of U.S. Pat. No. 4,269,813 (Klotz). The zeolite is treated in admixture with alpha-Al$_2$O$_3$ monohydrate beads at 205° C. for 18 hours. The cracking activity (α) of the zeolite is increased from 7 to 12.

Significant increases in the alpha value may be obtained with zeolites having a silica to alumina ratio of 1600:1 or more. Commensurate results may be obtained with other zeolites of differing silica to alumina ratio. The enhancement in activity is believed to be caused by the creation of additional, stable active internal sites in the zeolite because after the steaming treatment is complete, the Constraint Index remains consistent with that of the original zeolite structure although the alpha value has increased significantly. The catalyst therefore retains its original selectivity but with an improved acid activity.

The activated zeolite compositions produced by the present invention may be used as catalysts in acid catalyzed conversion reactions of the kind catalyzed by the type of zeolite used in the method. Hydrocarbon conversion reactions such as cracking, hydrocracking, alkylation, dealkylation, transalkylation, isomerization, polymerization, disproportionation and aromatization are particularly important but other reactions such as the conversion of oxygenates such as methanol or dimethyl ether to hydrocarbons are also of interest. The conditions employed in these reactions will be those appropriate to the particular catalyst being used, having due regard to its enhanced activity. The method is of particular utility for restoring activity to catalysts which have become inactivated during use.

While the invention has been described by specific examples and preferred embodiments, there is no intent to limit the inventive concept as set forth in the following claims.

EXAMPLE S 1H TO 7H

The ammonium form of a sample of ZSM-5 having a silica to alumina ratio of 26000:1 and hexane cracking activity (alpha value) of 0.02 (65 parts by weight) is wet milled with alpha alumina monohydrate (35 parts) and extruded into cylindrical pellets having a diameter of about 2mm., dried and calcined. Samples of this material are covered with water or sodium hydroxide solution in an open tube and maintained at different temperatures for varying amounts of time. For temperatures above 100° C., an autoclave was used. The apparatus employed comprises a steel autoclave equipped with temperature and pressure measuring devices and an internal sample support for holding open top test tubes, during treatment. A quantity of water is contained in the autoclave bottom, with test tubes being suspended in the liquid water. During the treatment the autoclave is heated to treatment temperature. The water vaporizes to form a saturated gas phase in equilibrium with the liquid phase at elevated temperature. The activated extrudate samples were recovered, post-treated with ammonium nitrate to base-exchange the catalyst, and calcined at 540° C. to convert them to the hydrogen form. The catalytic activity for cracking hexane (alpha activity) was then measured. The results are tabulated below:

TABLE I

| Example No. | Temp. (°C.) | Time | Alpha Activity | Notes |
|---|---|---|---|---|
| 1 | 165 | 1 day | 41 | Water |
| 2 | 100 | 8 days | 4.5 | Water |
| 3 | 170 | 1 day | 33 | Water |
| 4 | 165 | 1 day | 195 | 1N NaOH |
| 5 | 165 | 1 day | 72 | 0.2N NaOH |
| 6 | 25 | 1 day | 0.6 | 1N NaOH |
| 7 | 173 | 14 hrs. | 23 | Water |

EXAMPLE S 8H–10H

The above procedure is repeated except that different samples are treated simultaneously in the sealed autoclave at 130° C. for 64 hours and then at 170° C. for 24 hours. Control example 8 contains no alumina and consists of HZSM-5 (alpha =0.015). Example 9 in an extruded mixture of the particulate zeolite and alpha-alumina monohydrate binder in equal weight portions. Example 10 is an equal mixture of the zeolite with gamma alumina bead slurried with water. Loss of water during treatment was noted in Example 10 because the product, on removal, was dry. The results are shown in Table II.

TABLE II

| Example No. | Alumina | Treatment | Alpha Activity |
|---|---|---|---|
| 8 | nil | none | 0.015 |
| 9 | binder | hydrothermal | 41 |
| 10 | beads | hydrothermal | 7 |

This comparative experimentation shows that greater enhancement is obtained by more intimate contact between the solid materials such as was provided by alumina binder.

EXAMPLES 11H TO 15H

The procedure of Example 10 is repeated using an admixture of HZSM-5 and alpha-Al₂O₃ beads, except that the heating period is 1 day. The results are shown in Table III. Water loss was noted in Example 13.

TABLE III

| Example No. | Temp. (°C.) | Alpha Activity | Note |
| --- | --- | --- | --- |
| 11 | 165 | 7 | Water |
| 12 | 100 | 0.3 | Water |
| 13 | 170 | 2 | Water |
| 14 | 165 | 0.5 | Steam Only |
| 15 | 165 | 81 | 1-N NaOH Solution |

EXAMPLES 16H TO 18H

Portions of the same zeolite as that used in Example 1 were wet mulled with sodium aluminate, placed in test tubes, and treated in an excess of water at 165° C. in the autoclave.

The parts by weight of sodium aluminate per part of zeolite were as shown in Table IV. Example 17 lost water during treatment.

TABLE IV

| Example No. | Act. Agent | Alpha Activity | Note |
| --- | --- | --- | --- |
| 16 | NalO₂ | 148 | 0.6 parts |
| 17 | NaAlO₂ | 27 | 0.1 parts |
| 18 | NaAlO₂ | 223 | 0.5 parts |

EXAMPLE 19H

A sample of commercial Nickel-HZSM-5 extrudate prepared from 65 wt% ZSM-5 having a 70:1 silica to alumina ratio (and containing about 1 wt% nickel) and 35 wt% of alumina was tested for hexane cracking activity. Two minutes before sampling, 5 ml of $H_2S$ was added to the charge to minimize cracking due to nickel. The alpha value was found to be 56.

EXAMPLE 20H

A 2-gram sample of the same catalyst described in Example 19 was covered with 20 ml 0.2N $NaHCO_3$ in a teflon tube, capped to avoid loss of water, and placed in the sealed 500 ml autoclave containing 150 ml $H_2O$ to satisfy autogenous pressure requirements. It was heated overnight at 155° C. The product was exchanged for 60 hours (weekend) with 1-N $NH_4NO_3$ at ambient temperature. It was then washed, dried at 130° C., and tested for hexane cracking as in Example 19. The alpha value was 80.

EXAMPLE 21H

A 2-gram aliquot of the catalyst from Example 19 was treated as in Examples 20 except that 20 ml 0.2N potassium acetate instead of $NaHCO_3$ was used as the activator. The solution had an initial pH of 7.1 and a pH of 6.7 after use. The catalyst was tested as in Example 19 and was found to have an alpha value of 88.

EXAMPLE 22H

A 2-gram aliquot of the catalyst from Example 19 was treated as in Examples 20 and 21 except that sodium phosphate ($Na_2HPO_4$) was used as the activator. The initial pH was 8.4 and decreased to 7.1 during treatment. The alpha value of the treated catalyst was 123.

EXAMPLE 23H

A 2-gram sample of HZSM-5 extrudate that contained 35 wt% alumina and 65 wt% zeolite with a silica to alumina ratio of 70:1, and having an alpha value of about 225, was refluxed for 3 hours with 0.2 N NaOH, washed, exchanged with 1N $NH_4N_3$ as in Example 19, dried and tested for hexane cracking activity. The alpha value was 275.

EXAMPLE 24H

A sample of ZSM-5 zeolite having a silica to alumina ratio of 70:1, in the sodium form, was immersed in distilled water and treated for 4 hours at 88° C. in a shaker flask. It was then tested for its activity for converting methanol to hydrocarbons. For this purpose, methanol was passed over a fixed bed of the treated catalyst at 370° C. and 1 LHSV (liquid hourly space velocity). Very low conversion was observed. Conversion and product distribution are shown in Table V.

EXAMPLE 25H

The same sodium ZSM-5 zeolite as used in Example 24 was extruded with 35% alumina by weight, and the extrudate was subjected to treatment with water for 4 hours at 88° C. as in Example 24. Its methanol conversion activity tested at the same conditions used in Example 24 was very high. Conversion and product distribution are shown in Table V.

TABLE V

| | Example 24 | Example 25 |
| --- | --- | --- |
| Conversion (based on —$CH_2$— content) | 0.5% | 94% |
| Normalized Product Distribution, % | | |
| $C_1$–$C_5$ Paraffins | 67.7 | 31.1 $C_2$–$C_5$ |
| Olefins | 18.8 | 17.4 |
| $C_6+$ Aliphatics | | 24.3 |
| Aromatics | | 27.2 |
| Coke | 13.5 | less than 0.1 |

EXAMPLES 26H–30H

Samples of an extrudate that contained 65 wt% high silica ZSM-5 ($SiO_2/Al_2O_3$ = 26,000) in alumina were refluxed for 2 hours in aqueous NaOH solutions of various concentrations. The samples were then removed from the alkaline medium and ion-exchanged in excess 1N $NH_4NO_3$ at reflux for 2 hours. A second exchange with fresh $NH_4NO_3$ was then carried out. The samples were washed, dried at 120° C. and calcined at 538° C.

The treated extrudates were tested for n-hexane cracking activity. Results are plotted in FIG. 1 as alpha vs NaOH concentration. The starting material had an alpha = 0.02 (based on zeolite content). It is seen from FIG. 1 that with increasing NaOH concentration, alpha increased to 450 at 0.2 N NaOH, and drops back to 1.2 at 1N NaOH. The Constraint Index (CI) of the highest activity sample was found to be 7.9.

Examination of the product of Example 28 (alpha = 450) showed the zeolite to be 71% crystalline compared with the untreated extrudate (100% crystalline), and to display ortho- rhombic symmetry characteristic of ZSM-5 material with relatively low silica to alumina ratio. Sorption of 2-2 dimethylbutane was slightly diminished, consistent with crystallinity.

Further examination of the product of Example 28, converted to the ammonium form, showed a single desorption peak at 437° C., characteristic of normal ZSM-5 Bronsted acidity. The ion-exchange capacity measured by this method was 0.56 milliequivalents per gram, corresponding to a silica to alumina ratio of 37:1.

EXAMPLE 31H

The same extrudate as used in Examples 26-30 was treated at room temperature overnight with 0.2 N NaOH. The product, after exchange with ammonium salt and calcination, had an alpha value of 14.

EXAMPLE 1J 5.0 g NH$_4$-ZSM-5C (LDR-773-1-1B), binder-free, was added to 50 g 1 M aqueous NaOH contained in a polypropylene bottle. The mixture was allowed to stand at room temperature for 24 hours, and was then heated at 62° C. for ;70 additional hours. The mixture was cooled, filtered, washed well, and dried. The recovered solid was 1.62 g; 67.8% of the original material had dissolved. The x-ray pattern indicated the presence of ZSM-5 in teh recovered solid.

Initial zeolite:
Si/Al$_2$ (by elemental analysis) =74.6
Alpha (hexane cracking activity) =77
NH$_4$+exchange capacity (meq/g ash) =0.43
Product zeolite:
   Si/Al$_2$ (by elemental analysis) =16.6
   Na/Al (by elemental analysis) =1.0
   NH$_4$+exchange capacity (meq/g ash) =1.22 (equivalent in Si/Al$_2$ of 25.7)
   Alpha (hexane cracking activity) =322

EXAMPLE 2J 3.0 g NH$_4$-ZSM-5B (JAM-1086-11-1B), binder-free, was added to 100 ml 0.4 M aqueous NaOH contained in a polypropylene bottle. The mixture was shaken continuously at room temperature for 66 hours. After filtration and drying, the recovered solid was 0.9 g, indicating 70.5% of the original zeolite had dissolved. XRD confirmed the presence of ZSM-5 in the recovered solid.

Initial zeolite:
   Si/Al$_2$ (by elemental analysis) =66.7
   Alpha (hexane cracking activity) =130
   NH$_4$+exchange capacity (meq/g ash) =0.45
Product zeolite:
   Si/Al$_2$ (by elemental analysis) =16.0
   Na/Al (by elemental analysis) =1.1
   NH$_4$ exchange capacity =0.88 (equivalent to Si/Al$_2$ of 38)
   Alpha (hexane cracking activity) =311

EXAMPLE 1K

ZSM-5 crystals with SiO$_2$/Al$_2$O$_3$=70/1 calcined and free of binder was treated with Na$_2$CO$_3$ (0.5M) solution at refluxing temperature for 20 hours. The treated material was then NH$_4$+exchange. The zeolite was then calcined at 538° C. and tested for n-hexane cracking activity. The alpha increased from 328 to 825.

EXAMPLE S 2K and 3K

ZSM-5 with SiO$_2$/Al$_2$O$_3$=70/1 calcined and free fo binder was treated with Na$_2$CO$_3$/NaNO$_3$ (0.5M/0.6M) solution at refluxing temperature for 2 hours and 20 hours. The treated material was then NH$_4$+exchange. The zeolite was then calcined at 538° C. and tested for n-hexane cracking activity. Table 1 shows after 2 and 20 hours of treatment, the SiO$_2$/Al$_2$O$_3$ ratio (calculated from NH$_4$+TPD measurement) changes from 70/1 to 38/1 and 29/1 with respectively. The alpha changes from 328 to 420 and 1134 with respectively.

EXAMPLE 4K

ZSM-5 with SiO$_2$/Al$_2$O$_3$=850/1 was treated with Na$_2$CO$_3$/NaNO$_3$ (0.5M/0.6M) solution at refluxing temperatures for 20 hours. Table 2 shows the SiO$_2$/Al$_2$O$_3$ ratio increases from 850/1 to 48/1 and alpha increases from 4 to 1087.

TABLE 1

| Treatment time | Examples 2K and 3K | | |
|---|---|---|---|
| | Parent | 2 Hrs. | 20 Hrs. |
| Catalyst no. | CTC-116 | CTC-382 | CTC-365 |
| NH$_4$+ TPD (meq/g ash) | 0.4597 | 0.8398 | 1.0767 |
| SiO$_2$/Al$_2$O$_3$ | 71/1 | 38/1 | 29/1 |
| alpha | 328 | 420 | 1134 |

TABLE 2

| | Example 4 | |
|---|---|---|
| | Parent | 20 Hrs. |
| Catalyst no. | CTC-362 | CTC-374 |
| NH$_4$+ TPD (meq/g ash) | 0.0391 | 0.6656 |
| SiO$_2$/Al$_2$O$_3$ | 850/1 | 48/1 |
| alpha | 4 | 1087 |

Although in the preceeding examples extensive use was made of alumina as the preferred added activating metal oxide, it is to be understood that other metal or non-metal oxides which contain an element capable of being incorporated in the zeolite as a minor robust framework element are also contemplated as within the scope of this invention. Illustrative of such elements are gallium and iron as well as the other elements indicated by example as effective.

What is claimed is:

1. A method for modifying a calcined unbound porous crystalline high silica content inorganic solid comprising a calcined aluminosilicate having a silica to alumina ratio of at least about 70 and having a predetermined ion-exchange capacity after calcining, said solid being further characterized by the presence of extractable silica, which method comprises:
contacting in the absence of added organic nitrogen, organic phosphorus compound, or activating metal oxide, said porous solid with liquid water containing alkali metal cation, and anions selected from the group consisting of carbonate and nitrate, at a pH from about 7 to 12 and for from less than about one hour to 100 hours at a temperature up to 370° C.; and recovering a crystalline solid having an ion-exchange capacity greater than said porous crystalline high silica-content inorganic solid.

2. The method of claim 1 wherein said time and temperature are selected so as to yield at least 10 parts by weight of said recovered solid per 100 parts of said porous crystalline high silica-content inorganic solid.

3. The method of claim 1 wherein said liquid water contains carbonate.

4. The method of claim 1 wherein said liquid water contains nitrate.

5. The method of claim 1 wherein said liquid water contains carbonate and nitrate.

6. The method of claim 3 wherein said liquid water containing alkali metal cation is 0.5M $Na_2CO_3$ solution.

7. The method of claim 1 wherein said liquid water containing alkali metal cation is an 0.5M/0.6M $Na_2CO_3/NaNO_3$ solution.

8. The method of claim 1 wherein said recovered crystalline solid is ammonium-exchanged and then calcined.

9. The method of claim 1 wherein said silica to alumina molar ratio is about 70 to about 850.

* * * * *

UNITED STATES PATENT AND TRADEMARK OFFICE
CERTIFICATE OF CORRECTION

PATENT NO. : 4,876,228
DATED : October 24, 1989
INVENTOR(S) : Chang et al.

It is certified that error appears in the above-identified patent and that said Letters Patent is hereby corrected as shown below:

Patent column 2, line 11 reads "x=2) thre are" s/b --x=2) there are--

Patent column 2, line 33 reads "x=2 t0 10" s/b --x=2 to 10--

Patent column 5, line 47 reads "ZSM-21 ZSM-23," s/b --ZSM-21, ZSM-23,--

Patent column 6, line 20 reads "unkown" s/b --unknown--

Patent column 8, lines 13-14 read "exctractable" s/b --extractable--

Patent column 10, line 40 reads "EXAMPLE S 1B to 4B" s/b --EXAMPLES 1B to 4B--

Patent column 10, line 58 reads "EXAMPLE S 5B-7B" s/b --EXAMPLES 5B - 7B--

Patent column 11, line 12 reads "EXAMPLE S 8B to .11B" s/b --EXAMPLES 8B to 11B--

Patent column 15, line 23 reads "EXAMPLE S 7C-8C" s/b --EXAMPLES 7C - 8C--

Patent column 17, line 34 reads "EXAMPLE S 12C-14C" s/b --EXAMPLES 12C to 14C--

Patent column 18, line 22 reads "EXAMPLE S 15C-16C" s/b --EXAMPLES 15C - 16C--

Patent column 18, line 40 reads "EXAMPLE S 17C-18C" s/b --EXAMPLES 17C   18C--

UNITED STATES PATENT AND TRADEMARK OFFICE
CERTIFICATE OF CORRECTION

PATENT NO. : 4,876,228

DATED : October 24, 1989

INVENTOR(S) : Chang et al.

It is certified that error appears in the above-identified patent and that said Letters Patent is hereby corrected as shown below:

Patent column 19, line 1 reads "EXAMPLE S 19C-22C" s/b --EXAMPLES 19C - 22C--

Patent column 23, line 17 reads "EXAMPLE S 1G TO 7G" s/b --EXAMPLES 1G to 7G--

Patent column 23, line 39 reads "EXAMPLE S 8G-10G" s/b --EXAMPLES 8G - 10G--

Patent column 23, line 60 reads "EXAMPLE S 11G to 15G" s/b --EXAMPLES 11G to 15G--

Patent column 24, line 31 reads "EXAMPLE S 16G to 29G" s/b --EXAMPLES 16G to 29G--

Patent column 25, line 65 reads "EXAMPLE S 1H to 7H'' s/b --EXAMPLES 1H to 7H--

Patent column 26, line 44 reads "EXAMPLE S 8H-10H" s/b --EXAMPLES 8H - 10H--

Patent column 27, line 1 reads "EXAMPLE S 11H to 15H" s/b --EXAMPLES 11H to 15H--

Patent column 27, line 17 reads "EXAMPLE S 16H to 18H" s/b --EXAMPLES 16H to 18H--

Patent column 28, line 41 reads "EXAMPLE S 26H-30H" s/b --EXAMPLES 26H - 30H--

UNITED STATES PATENT AND TRADEMARK OFFICE
CERTIFICATE OF CORRECTION

PATENT NO. : 4,876,228

DATED : October 24, 1989

INVENTOR(S) : Chang et al.

It is certified that error appears in the above-identified patent and that said Letters Patent is hereby corrected as shown below:

Patent column 29, line 22 reads "in teh" s/b --in the--

Patent column 29, line 62 reads "EXAMPLE S 2K and 3K" s/b --EXAMPLES 2K and 3K--

Signed and Sealed this

Twenty-fourth Day of December, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,876,228

DATED : October 24, 1989

INVENTOR(S) : C. D. Chang and C. T-W. Chu

It is certified that error appears in the above-identified patent and that said Letters Patent is hereby corrected as shown below:

On the title page:

Item [75] Inventors: should read --Clarence D. Chang and Cynthia T-W. Chu--.

Signed and Sealed this

Fourth Day of February, 1992

Attest:

HARRY F. MANBECK, JR.

Attesting Officer      Commissioner of Patents and Trademarks